United States Patent
Xu et al.

(10) Patent No.: US 7,874,666 B2
(45) Date of Patent: Jan. 25, 2011

(54) SMART SUNGLASSES, HELMET FACESHIELDS AND GOGGLES BASED ON ELECTROCHROMIC POLYMERS

(75) Inventors: Chunye Xu, Seattle, WA (US); Chao Ma, Seattle, WA (US); Minoru Taya, Mercer Island, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 0 days.

(21) Appl. No.: 12/055,868

(22) Filed: Mar. 26, 2008

(65) Prior Publication Data

US 2008/0239452 A1  Oct. 2, 2008

Related U.S. Application Data

(60) Provisional application No. 60/908,102, filed on Mar. 26, 2007.

(51) Int. Cl.
G02C 7/10 (2006.01)

(52) U.S. Cl. .................. 351/44; 351/158; 359/652; 2/15

(58) Field of Classification Search .......... 351/41, 351/44, 158; 349/13, 14; 359/265; 2/15, 2/426–434
See application file for complete search history.

(56) References Cited

U.S. PATENT DOCUMENTS

| | | | | |
|---|---|---|---|---|
| 4,702,963 A | 10/1987 | Phillips et al. | ............. | 428/426 |
| 4,761,061 A | 8/1988 | Nishiyama et al. | .......... | 359/265 |
| 4,768,865 A | 9/1988 | Greenberg et al. | .......... | 350/357 |
| 4,933,106 A | 6/1990 | Sakai et al. | ................. | 252/500 |
| 4,993,810 A | 2/1991 | Demiryont | ................. | 359/265 |
| 5,006,633 A | 4/1991 | Shikatani et al. | ............ | 528/230 |
| 5,015,086 A | 5/1991 | Okaue et al. | ................. | 351/44 |
| 5,042,923 A | 8/1991 | Wolf et al. | ................. | 359/275 |

(Continued)

FOREIGN PATENT DOCUMENTS

JP  62265630  11/1987

(Continued)

OTHER PUBLICATIONS

Sapp, Shawn A. et al. 1998, "High Contrast Ratio and Fast-Switching Dual Polymer Electrochromic Devices." *Chem. Mater.* 10: 2101-2108.

(Continued)

*Primary Examiner*—Huy K Mai

(57) ABSTRACT

Eyewear exhibiting a variable light transmittance functionality is achieved by including a smart lens incorporating an electrochromic (EC) polymer, switchable between a first state and a second state in response to a voltage selectively applied thereto. The smart eyewear includes the smart lens, a voltage source, and a support. The EC polymer transmits more light in the first state than in the second state, because changing the state of the EC polymer varies the light transmittance of the smart lens. The voltage source is configured to provide the voltage required to switch the EC polymer between the first state and the second state, while the support member is configured to support the smart lens and enable a user to wear the smart eyewear. Embodiments can include sensors and controllers to automate the switching, as well as energy harvesting elements to increase battery life.

23 Claims, 8 Drawing Sheets

U.S. PATENT DOCUMENTS

| | | | |
|---|---|---|---|
| 5,067,795 A * | 11/1991 | Senatore | 349/14 |
| 5,124,833 A | 6/1992 | Barton et al. | 359/269 |
| 5,187,034 A | 2/1993 | Otagawa et al. | 429/213 |
| 5,321,544 A | 6/1994 | Parkhe et al. | 359/273 |
| 5,377,037 A | 12/1994 | Branz et al. | 359/265 |
| 5,404,244 A | 4/1995 | Van Dine et al. | 359/270 |
| 5,457,564 A | 10/1995 | Leventis et al. | 359/271 |
| 5,598,293 A | 1/1997 | Green | 359/275 |
| 5,699,192 A | 12/1997 | Van Dine et al. | 359/269 |
| 5,724,176 A | 3/1998 | Nishikitani et al. | 359/271 |
| 5,818,636 A | 10/1998 | Leventis et al. | 359/273 |
| 5,883,220 A | 3/1999 | Armand et al. | 528/322 |
| 5,888,431 A | 3/1999 | Tonar et al. | 252/583 |
| 5,905,590 A | 5/1999 | Van Der Sluis et al. | 359/275 |
| 6,005,705 A | 12/1999 | Schmidt et al. | 359/265 |
| 6,011,642 A | 1/2000 | Vink et al. | 359/273 |
| 6,136,161 A | 10/2000 | Yu et al. | 204/192.29 |
| 6,197,923 B1 | 3/2001 | Yamamoto | 528/424 |
| 6,359,149 B1 | 3/2002 | Tan et al. | 549/50 |
| 6,373,618 B1 | 4/2002 | Agrawal et al. | 359/265 |
| 6,433,913 B1 * | 8/2002 | Bauer et al. | 359/265 |
| 6,555,945 B1 | 4/2003 | Baughman et al. | 310/300 |
| 6,589,383 B1 | 7/2003 | Takaoka et al. | 156/313 |
| 6,617,462 B1 | 9/2003 | Tan et al. | 549/29 |
| 6,667,825 B2 | 12/2003 | Lu et al. | 359/265 |
| 6,728,022 B2 | 4/2004 | Asano et al. | 359/265 |
| 6,730,212 B1 | 5/2004 | Yamagishi et al. | 205/777.5 |
| 6,734,956 B2 | 5/2004 | Byrne et al. | 356/128 |
| 6,791,738 B2 | 9/2004 | Reynolds et al. | 359/265 |
| 6,806,989 B2 | 10/2004 | Berneth | 359/265 |
| 6,828,062 B2 | 12/2004 | Lu et al. | 429/213 |
| 6,855,431 B2 | 2/2005 | Varaprasad et al. | 428/432 |
| 6,906,842 B2 | 6/2005 | Agrawal et al. | 359/265 |
| 6,950,220 B2 | 9/2005 | Abramson et al. | 359/265 |
| 6,965,509 B2 | 11/2005 | Reynolds et al. | 361/528 |
| 7,256,923 B2 * | 8/2007 | Liu et al. | 359/265 |
| 7,334,892 B2 * | 2/2008 | Goodall et al. | 351/159 |
| 7,626,748 B2 * | 12/2009 | Radmard et al. | 359/265 |
| 2005/0025980 A1 | 2/2005 | Agrawal et al. | 428/426 |
| 2005/0210672 A1 | 9/2005 | Reynolds et al. | 29/830 |
| 2005/0237485 A1 | 10/2005 | Blum et al. | 351/168 |
| 2006/0066933 A1 | 3/2006 | Jagt et al. | 359/265 |
| 2007/0292606 A1 | 12/2007 | Demiryont et al. | 427/126.5 |
| 2008/0203910 A1 | 8/2008 | Reynolds | 313/506 |

FOREIGN PATENT DOCUMENTS

| | | | | |
|---|---|---|---|---|
| WO | WO 92/10130 | * | 6/1992 | 349/13 |
| WO | WO 03/001290 A1 | | 1/2003 | |

OTHER PUBLICATIONS

Schwenderman, Irina et al. 2001. "Combined Visible and Infrared Electrochromism Using Dual Polymer Devices." *Advanced Materials* 13:9 634-637.

Welsh, Dean M. et al. 1999. "Enhanced Contrast Ratios and Rapid Switching in Electrochromics Based on Poly (3,4-propylenediozythiophene) Derivitives." *Advanced Materials* 11:16 1379-1382.

Xu et al., "Enhanced Contrast Ratios and Rapid Switching Color Changeable Devices Based on Poly(3,4-Propylenedioxythiophene) Derivative and Counterelectrode", Proc. SPIE, vol. 4695; 2002; pp. 442-450.

* cited by examiner

SMART SUNGLASSES, HELMET FACESHIELDS AND GOGGLES BASED ON ELECTROCHROMIC POLYMERS

RELATED APPLICATIONS

This application is based on a prior provisional application Ser. No. 60/908,102, filed on Mar. 26, 2007, the benefit of the filing date of which is hereby claimed under 35 U.S.C. §119 (e).

BACKGROUND

Sunglasses are popular as fashion items, but are also used to protect the wearer's eyes from harmful effects of sunlight, such as cataracts, macular degeneration, and photokeratitis. Traditional materials used to make lenses for sunglasses include plastic (polycarbonate and CR-39 resins) and crown glass. Such lenses are generally tinted to reduce the transmittance of the lens, or include a polarized layer that reduces light intensity by about 50% and can reduce the glare of reflected light. Typically, the lenses of sunglasses are invariant, in that such lenses exhibit only one fixed color state, and their transparency is not variable (other than in regard to the polarization angle of the light relative to the lens polarization axes—if polarized lenses are used). During outdoor activities such as motorcycling and skiing, sunlight conditions can vary considerably, and invariant conventional lenses cannot adjust to such varying conditions of brightness in the ambient light.

Photochromic lenses were developed to address this issue. Photochromic lenses incorporate light sensitive molecules into the lens (or into a film applied to the lens). Such light sensitive molecules cause the lenses to become less transparent when exposed to ultra-violet (UV) radiation. Once the UV component of the ambient light is substantially reduced (for example, by walking indoors), the lenses gradually return to their clear state. Photochromic glass lenses generally incorporate silver halides into the lens, while polymer photochromic lenses employ organic molecules, such as oxazines and napthopyrans.

Typically, photochromic lenses darken substantially in response to UV light in less than one minute, and then continue to darken very slightly over the next fifteen minutes. As soon as exposure to the UV light ceases, the lenses begin to clear, becoming noticeably less tinted within two minutes, and are generally transparent within five minutes. However, it normally takes more than fifteen minutes for the lenses to become completely transparent.

In addition to the relatively slow response time of these passive photochromic lenses, such lenses exhibit temperature dependency, which prevents such lenses from achieving the darker tints in hot weather that they do when exposed to milder weather. In contrast, photochromic lenses achieve deep tints when exposed to cold weather conditions. Thus, photochromic lenses are more suitable for snow skiers than beachgoers. The temperature dependency also increases the time required for tinted lenses to return to their transparent state after exposure of the lenses to UV radiation has been terminated.

Yet another limiting factor for photochromic lenses is that they respond only to UV radiation, and not visible light. Because most vehicle windows act as a UV filter, photochromic lenses will not be exposed to much UV radiation when worn in a car, and thus, will not achieve the deeper tints for blocking light desired for sunglasses in bright environments.

In contrast, smart color change materials (as opposed to the passive photochromic materials discussed above) are characterized by their ability to vary their transparency (i.e., their transmittance values) upon application of an electric potential across the materials. Smart color change materials include suspended particles, liquid crystals, and electrochromics. Suspended particle devices (SPD) and liquid crystal devices (LCD) are capable of rapid switching, and do not suffer from the UV and temperature dependencies of passive photochromic materials. However, SPDs and LCDs require high voltages be applied to control light transmittance. Further, they are characterized by relatively high production costs, complex manufacturing requirements, lack of memory function, and limited color availability that has prevented them from being used in smart sunglasses and goggles.

Electrochromic (EC) materials can change their color when an electrical potential is applied, due to electrochemical oxidation and reduction reactions occurring within the materials. However, EC materials based on inorganic transition metal oxides (such as $WO_3$) have relatively slow response times (on the order of tens of seconds), and relatively high processing costs.

EC polymers are more promising materials for use in sunglasses. EC polymer based devices (ECDs) exhibit several desirable characteristics. They require power only during switching state; their operating voltages and energy consumption are low; they have rapid response times; they exhibit an open circuit memory function; they exhibit great repeatability; they offer rich color choices; and they are relatively easy to manufacture. Based on these characteristics, it clearly would be desirable to provide smart eyewear incorporating EC polymers having these advantages.

SUMMARY

A first aspect of the concepts disclosed herein is an EC polymer based smart eyewear exhibiting a variable light transmittance functionality. The smart eyewear includes a smart lens member, a voltage source member, and a support member. The smart lens member includes an EC polymer switchable between a first state and a second state, by selectively applying a voltage thereto. Significantly, the EC polymer transmits a larger amount of light in the first state than in the second state, thus, changing the state of the EC polymer varies the light transmittance of the smart lens. The voltage source member is configured to provide the voltage required to switch the EC polymer between the first state and the second state, while the support member is configured to support the smart lens and enable a user to wear the smart eyewear. In at least some exemplary embodiments, the voltage source member comprises a portable battery that is electrically coupled to the smart lens member, although if the smart eyewear is intended to be used primarily in a fixed location, such as a vehicle, then a power source in the vehicle could be used to provide the voltage.

In at least one exemplary embodiment, the smart eyewear further includes a user interface configured to enable a user to selectively switch the EC polymer between the first state and the second state. (As discussed in greater detail below, a sensor can be incorporated into the smart eyewear to trigger the EC polymer so that it switches between states automatically, optionally eliminating the need for a user interface.) In an exemplary (but not limiting) embodiment including a user interface, the user interface comprises a touch sensor switch. Alternatively, a rocker switch or rotary dial can be employed to control the state of the EC polymer. Those of ordinary skill in the art will recognize that many different types of user-actuatable switches can be employed for this purpose. Where the EC polymer exhibits different transmittance properties in the second state, dependent upon the applied voltage, the user interface can enable the voltage to be selectively varied, to selectively vary the transmittance of the EC polymer over a desired range between the first state and the second state.

In another exemplary, but not limiting embodiment, the smart eyewear further includes a controller configured to control the state of the EC polymer. For example, the controller can be operatively coupled to the smart lens member and the voltage source member. In at least one embodiment, the controller is integrated into the support member, such that the controller is not readily visible. Yet another exemplary embodiment includes a light sensor operatively coupled to the controller, such that the controller is configured to automatically switch the EC polymer between the first state and the second state based on a signal provided by the light sensor (for example, when the sensor detects light levels exceeding a predetermined threshold value), or the controller can vary the voltage applied to the EC polymer to selectively vary its transmittance as a function of the brightness levels of light incident on the light sensor. In still another exemplary embodiment, the smart eyewear includes a microphone operatively coupled to the controller, such that the controller is configured to automatically switch the EC polymer between the first state and the second state based on a signal provided by the microphone (for example, the smart eyewear can be voice activated to respond to a spoken command to change the transmittance level of the EC polymer).

In another exemplary, but not limiting embodiment, the EC polymer in the smart lens member is configured as a plurality of individually addressable pixels arranged in a grid format over the smart lens member, with each pixel being switchable between a transparent state and non-transparent state, by selectively applying a voltage thereto. For example, the controller can be operatively coupled to each pixel, and the plurality of individually addressable pixels can be implemented using different color EC polymers, enabling either one or both of a tint and a color associated with the smart lens member to be selectively varied by manipulating the plurality of individually addressable pixels. In another example, the controller is operatively coupled to each pixel, and the controller is configured or programmed to selectively actuate pixels disposed proximate on a specific portion (e.g., on an upper portion) of the lens, such that the smart lens member transmits less light at that area.

In still another exemplary, but not limiting embodiment, the smart eyewear further includes an energy harvesting element comprising the voltage source and configured to enable energy harvested from a user of the smart eyewear to provide the voltage required to switch the EC polymer between the first state and the second state. In at least some embodiments, the energy harvesting element is operatively coupled to a rechargeable battery, which comprises the voltage source. Exemplary energy harvesting elements include, but are not limited to, devices that convert heat energy produced by the body of a user of the smart eyewear into electrical energy. Such devices can be based on junctions formed of dissimilar metals or semiconductors, can produce electrical energy when there is a difference of more than about two degrees Celsius between the user's body and the ambient environment, and can be integrated into the support member.

In at least one embodiment, the EC polymer in the smart lens member is disposed only in an upper portion of the smart lens member, such that when the EC polymer is in the second state, the smart lens member transmits less light at that area. In a related embodiment, the EC polymer in the smart lens member includes a first EC polymer disposed in an upper portion of the smart lens member, and a second EC polymer disposed in a lower portion of the smart lens member, such that a transmittance of the upper and lower portions of the smart lens member can be individually and separately controlled.

The smart eyewear can employ a single smart lens member when the smart eyewear is implemented as a face shield of a helmet, or used in glasses or goggles including only a single large lens covering both eyes. In other exemplary embodiments, the smart eyewear includes an additional smart lens member, as in conventional eyeglasses and sunglasses that include pairs of lenses—one lens for each eye of the user.

In at least one exemplary embodiment, the smart lens member comprises a laminated EC device structure having a cathodic EC polymer layer and no anodic EC polymer layer.

In at least another exemplary embodiment, the smart lens member comprises a laminated structure including the EC polymer, wherein the laminated structure includes a substantially transparent electrode substrate, a substantially transparent gel electrolyte (such that the EC polymer is disposed between the substantially transparent electrode substrate and the substantially transparent gel electrolyte), an ion storage layer, and a substantially transparent electrode upper layer (such that the ion storage layer is disposed between the substantially transparent electrode upper layer and the substantially transparent gel electrolyte). In at least one related exemplary embodiment, at least one of the substantially transparent electrode upper layer and the substantially transparent electrode substrate comprises a flange that extends beyond an edge of the laminated structure, the flange being configured to facilitate coupling the laminated structure to the support member. In at least another exemplary embodiment, the ion storage layer comprises a vanadium pentoxide film (thus, collectively, the ion storage layer and the substantially transparent electrode upper layer function as a counter-electrode). In at least one exemplary embodiment, the vanadium pentoxide film exhibits a green tint, such that even when the EC polymer is in the first state, a transmittance of the smart lens member is reduced due to the green tint. In another exemplary embodiment, the substantially transparent electrode upper layer is covered by an anti-UV layer configured to reduce an amount of UV radiation entering the laminated structure.

Yet another aspect of the concepts disclosed herein encompasses smart eyewear exhibiting a variable light transmittance functionality, where the smart eyewear includes a smart lens member including at least one EC polymer, each EC polymer being switchable between a first state and a second state by selectively applying a voltage thereto (wherein the EC polymer transmits a larger amount of light in the first state than in the second state), a voltage source for providing the voltage required to switch each EC polymer between the first state and the second state, and a support member configured to support the lens and enable a user to wear the smart eyewear. The voltage source can comprise disposable batteries, or rechargeable batteries, and may use conductors to convey voltage from the voltage source to the smart lens member. In addition, the voltage source may comprise energy harvesting elements, may be integrated into the smart eyewear, or external to the smart eyewear, and may employ permutations and combinations of each of the alternatives.

Still another aspect of the concepts disclosed herein encompasses a smart lens exhibiting a variable light transmittance functionality, including: (1) a substantially transparent electrode substrate; (2) an EC polymer, the EC polymer being switchable between a first state and a second state by selectively applying a voltage thereto, so that the EC polymer transmits more light in the first state than in the second state;

(3) a substantially transparent gel electrolyte disposed between the substantially transparent electrode substrate and the substantially transparent gel electrolyte; (4) an ion storage layer; (5) a substantially transparent electrode upper layer disposed between the substantially transparent electrode upper layer and the substantially transparent gel electrolyte; and, (6) electrical conductors that couple the smart lens to a voltage source. The electrical conductors may comprise flexible electrical conductors, electrically conductive adhesives, wire-based electrical conductors, conductive flanges extending outwardly from the laminated structure, and permutations and combinations thereof.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1A schematically illustrates a smart lens including an EC polymer;

FIG. 1B is a side view of the smart lens of FIG. 1A;

FIG. 2 graphically illustrates photo spectrum curves of the smart lens of FIG. 1A between 380 nm and 800 nm, for both the transparent state and the colored state;

FIG. 3A graphically illustrates photo spectrum curves of the smart lens of FIG. 1A between 380 nm and 800 nm, illustrating its response to an applied potential varying from about 0.2 V to about 1.4 V;

FIG. 3B graphically illustrates transmittance of the smart lens of FIG. 1A at 580 nm, in response to an applied potential ranging from about 0.2 V to about 1.4 V;

FIG. 4 graphically illustrates a response time curve for the smart lens of FIG. 1A, in response to an applied potential of ±1.2 VDC;

Figure 9:
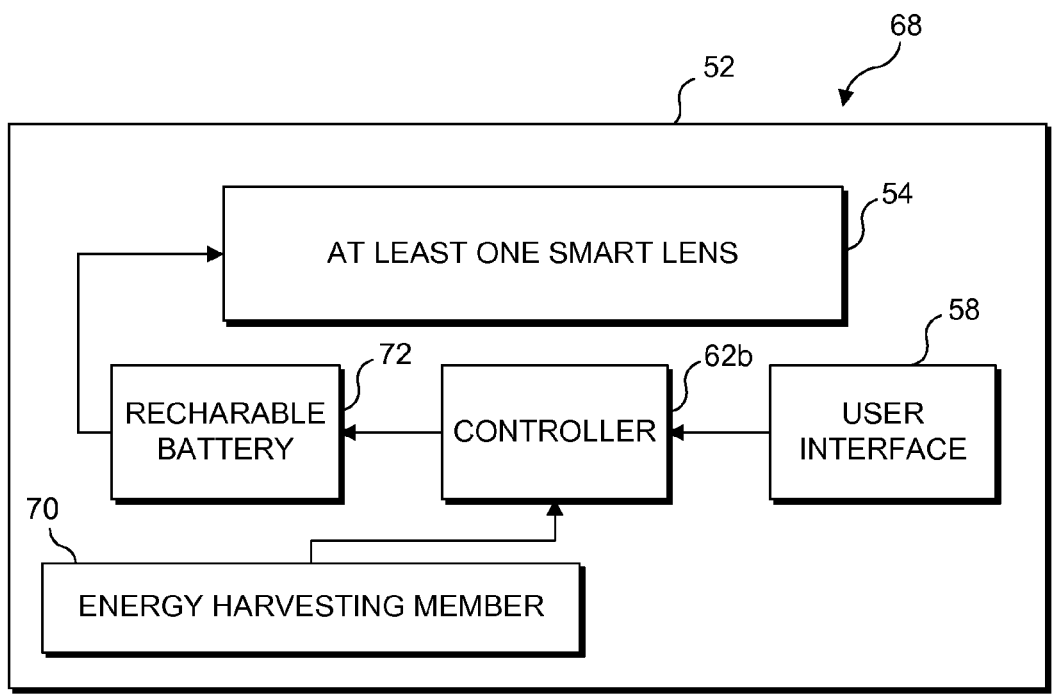
FIG. 9 is a block diagram of an exemplary embodiment of smart eyewear including an energy harvesting member that derives energy from the user's body (or the temperature differential between ambient and that of the user's body)
Figure 10:
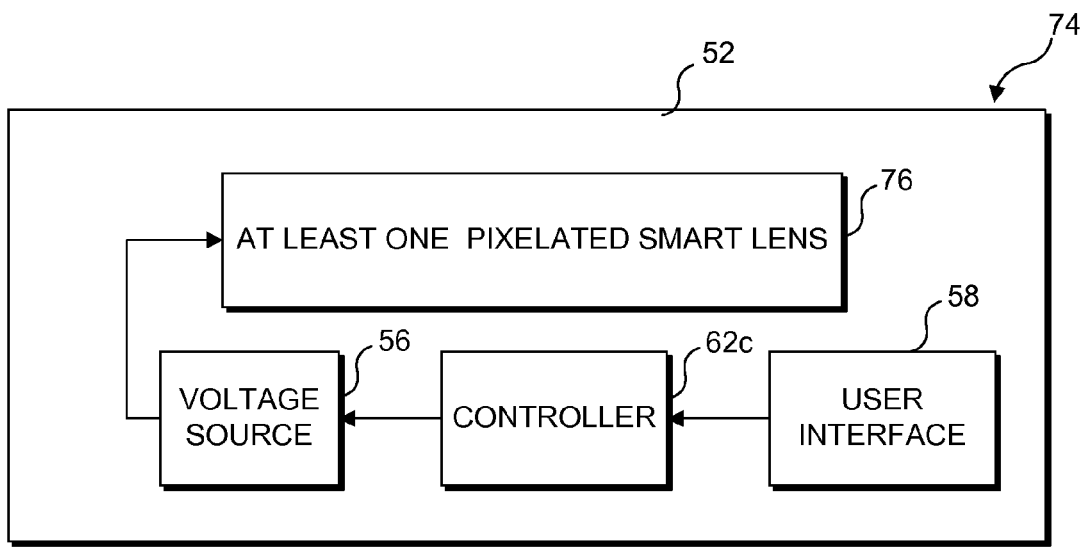
FIG. 10 is a block diagram of an embodiment of smart eyewear including a pixelated smart lens.
Figure 11:
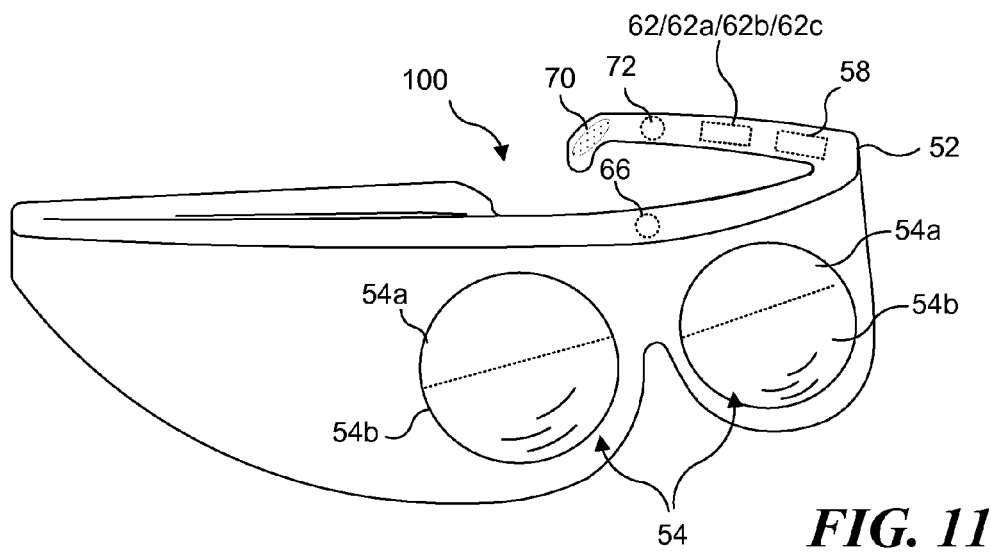
Figure 12:
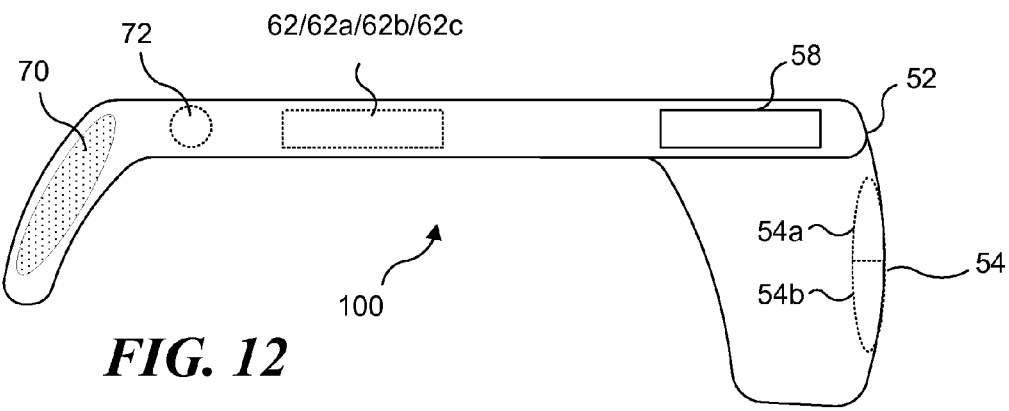
Figure 13:
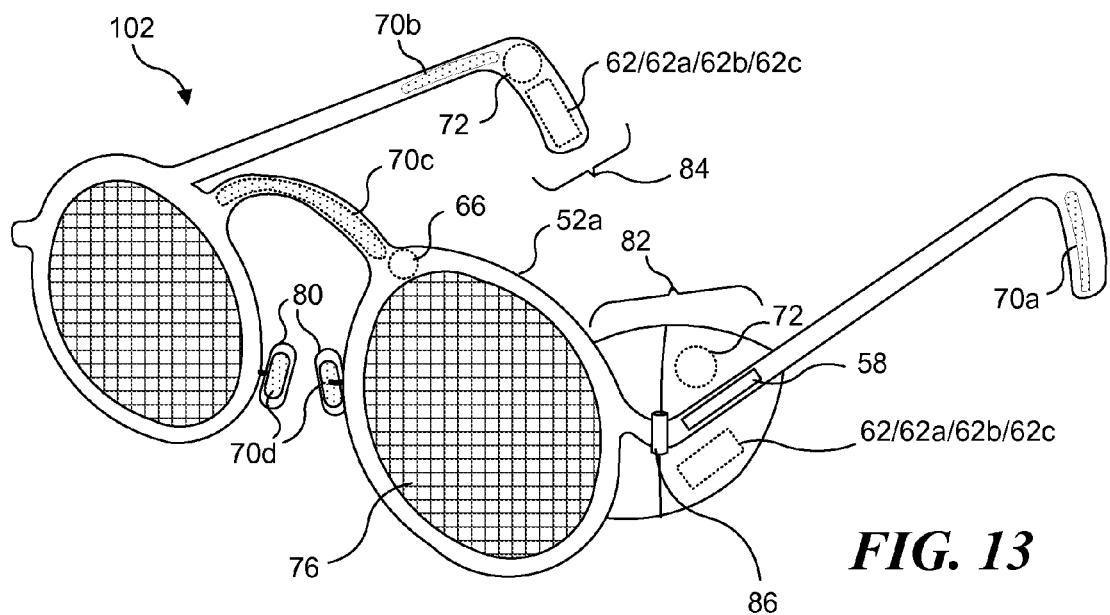
Figure 14:
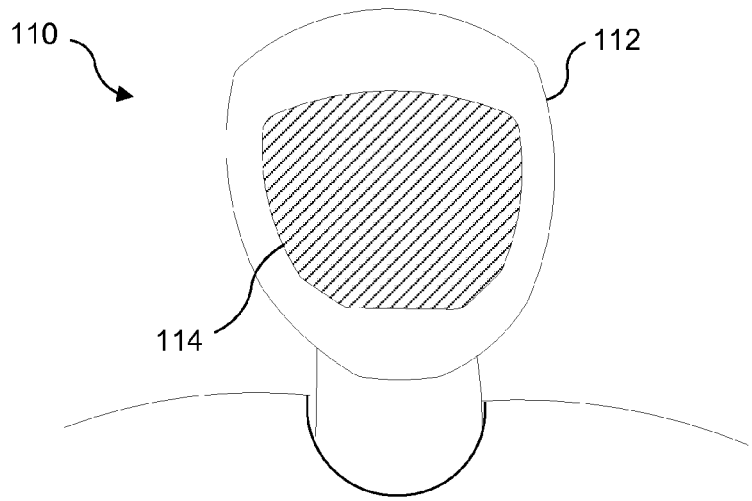
Figure 15:
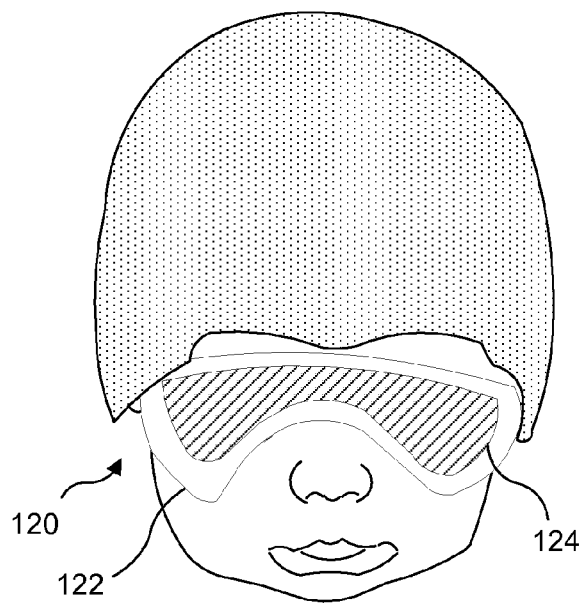
Figure 16A:
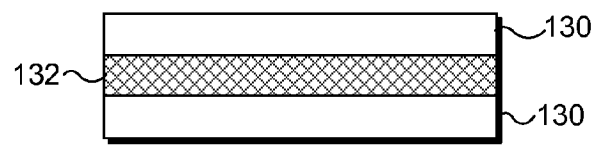
Figure 16B:
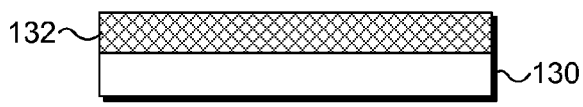

FIGS. 11 and 12 schematically illustrate a pair of smart glasses 100, which as shown incorporate a plurality of the elements disclosed with respect to FIGS. 6-10;

FIG. 13 schematically illustrates a pair of smart glasses 102, which as shown incorporates a plurality of the elements disclosed with respect to FIGS. 6-10;

FIG. 14 schematically illustrates a smart helmet 110 being worn by a user;

FIG. 15 schematically illustrates a pair of smart goggles 120 being worn by a user; and FIGS. 16A and 16B schematically illustrate incorporating a smart lens into optical blanks to be used to make prescription eyewear.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

As employed herein and in the claims that follow, the term smart eyewear is intended to refer to eyewear that can be worn by a user, where the eyewear exhibits variable light transmittance functionality, due to the incorporation of an EC polymer (switchable between a first state and a second state, where a transmittance of the second state is less that a transmittance in the first state) into one or more lenses in the eyewear. The term smart eyewear encompasses (but is not limited to) the following types of eyewear: sunglasses including a single lens configured to cover both eyes, sunglasses including two lenses (each lens intended to cover one eye), goggles including a single lens configured to cover both eyes, goggles including two lenses (each lens intended to cover one eye), and face shields (where the face shield is used as part of a helmet, or used with a support member to enable the face shield to be worn by a user). The term voltage source for providing a required voltage to the EC polymer encompasses, without any implied limitation, disposable batteries, rechargeable batteries, electrical conductors required to convey voltage from a voltage source to the EC polymer portion of the lens, energy harvesting elements that derive electrical power from the user/ambient environment, voltage sources integrated into the smart eyewear, voltage sources external to the smart eyewear, and permutations and combinations thereof. The electrical conductors used to couple the smart lens to a voltage source encompass (without any intent to limit) flexible electrical conductors, electrically conductive adhesives or coatings, wire-based electrical conductors, foil on a substrate, flanges extending outwardly from the laminated structure, and permutations and combinations thereof.

EC polymer materials exhibiting either blue, red, or green colors have been developed. While a working prototype has been fabricated using a specific EC polymer, [3,3-dimethyl-3,4-dihydro-2H-thieno[3,4-b][1,4]dioxepine] (PPropOT-Me$_2$), it should be recognized that use of such an EC polymer is intended to be exemplary, and not limiting. Furthermore, while the prototype includes only a single EC polymer, it should be recognized that the concepts disclosed herein encompass smart eyewear including more than one type of EC polymer. As noted above, blue, red, and green EC polymers are known, and at least one embodiment disclosed herein employs green, red, and blue EC polymers configured in a pixelated orientation, with each pixel being individually addressable, to enable a highly versatile smart eyewear embodiment to be achieved.

The following list of EC polymers can be beneficially employed, although it should be recognized that the following list is intended to be exemplary, rather than limiting. Blue in one state, clear in the second state: Poly[3-methyl-3'-propyl-3,4-dihydro-2H-thieno(3,4-b)(1,4)dioxepine] (PPropOT-MePro). Red in one state, clear in the second state: Poly[3,3-diethyl-3,4-dihydro-2H,7H-(1,4)dioxepino(2,3-c)pyrrole] (PPropOP-Et$_2$). Green in one state, red in the second state: EC polymer based on 2,5-di-(thien-2-yl)-3,4-di(2,2,2-trifluoroethoxy)-thiopene. Green in one state, purple in the second state: EC polymer based on 2,5-(2,3-dihydro-thieno [3,4][1,4]dioxin-5-yl)-3,4-di(2,2,2-trifluoroethoxy)-thiopene. Green in one state, clear in the second state: EC polymer based on 2,3-dibenzyl-5,7-di(thien-2-yl)-thieno-[3,4]-pyrazine.

In the working prototype, the PPropOT-Me$_2$ EC film exhibits desirable properties, such as a high transmittance contrast ratio ($\Delta\%$ T) between a blue color (the second state) and a transparent state (the first state), low operation voltage potentials required to switch between the first and second states, high conductivity, and high thermal stability.

Figure 1A:
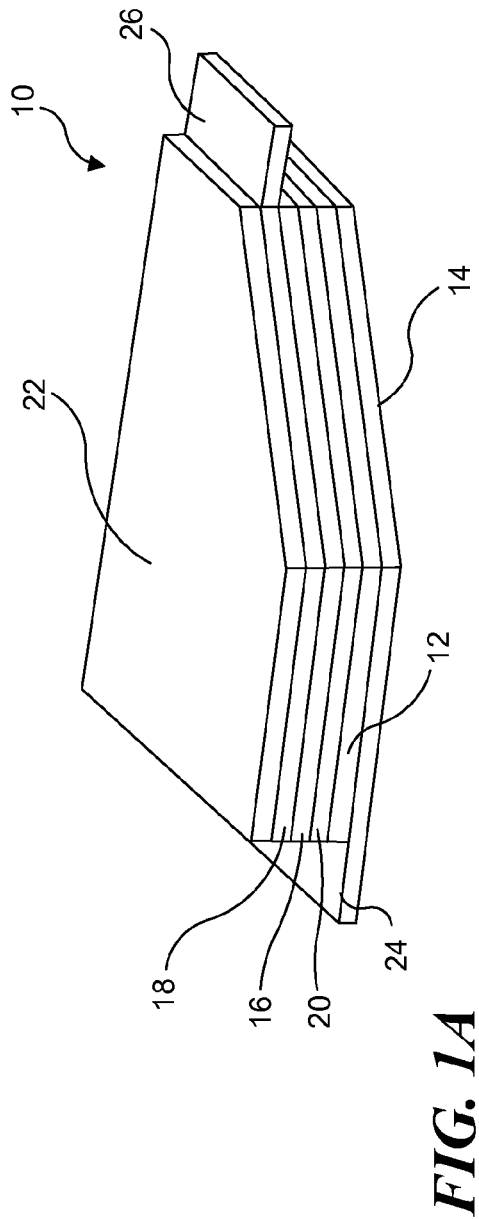
Figure 1B:
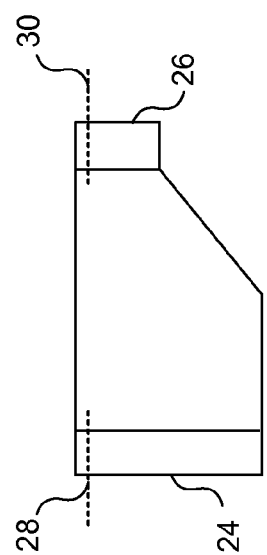

One exemplary smart lens 10 for the smart eyewear disclosed herein is a multilayered (i.e., laminated) EC device, schematically illustrated in FIG. 1A and FIG. 1B (while these Figures illustrate a left lens, it should be recognized that the same structure can be used to create a right lens, the right lens being a mirror image of the left lens). The EC working layer, a PPropOT-Me$_2$ film 12, is deposited on an Indium Tin oxide (ITO) coated glass substrate 14. The counter electrode layer of this embodiment is a vanadium oxide ($V_2O_5$) film 16, also deposited on ITO coated glass substrate 18. The $V_2O_5$ film serves as an ion storage layer and works with the PPropOT-Me$_2$ film as a pair. When used in combination with an electrolyte layer including lithium perchlorate, the EC film is reduced with an applied potential and changes color to blue, the $V_2O_5$ film will simultaneously absorb $ClO_4^-$ ions (provided by a gel electrolyte layer 20). When the EC film is oxidized with an opposite potential and changes to the transparent state, the $V_2O_5$ film will absorb $Li^+$ ions (also provided by a gel electrolyte layer 20). During switching, the $V_2O_5$ film maintains a light green color (thus, even when the EC polymer is in the first transparent state, the transmittance of the lens will be somewhat reduced, due to the green tint from the $V_2O_5$ film). Such a tint is not problematic for smart eyewear intended to be used in outdoor daylight environments. Other embodiments can employ a different counter electrode design, to eliminate such tinting, if no reduction in the transmittance of the lens is desired when the EC polymer is in the transparent state. If the slight tint due to the $V_2O_5$ film is considered undesirable, other types of counter-electrode materials can be investigated. For example, composites materials including $V_2O_5$ and another metal oxide, such as $TiO_2$, should provide the charge balancing functionality with a less noticeable tint. Those of ordinary skill in the art will recognize that many other metal oxides are known that can be tested for their charge balancing and optical clarity properties.

It should also be noted that the saturation of the tint due to the $V_2O_5$ film is a function of the relative thickness of the $V_2O_5$ film. The thinner the $V_2O_5$ film, the less noticeable will be the tint. The function of the $V_2O_5$ layer is to maintain a proper charge balance during operation of the smart lens. The $V_2O_5$ layer need only be as thick as is required to achieve a charge capacity that is equal to or larger than the charge capacity of the EC polymer film layer.

Transparent polymer gel electrolyte layer 20 is a good conductor for small ions such as $ClO_4^-$ and $Li^+$ while being an insulator for electrons, and is sandwiched between the working electrode layer (i.e., the EC polymer film and the ITO substrate) and the counter electrode layer (i.e., $V_2O_5$ film and the ITO substrate). Gel electrolyte layer 20 is an ion transport layer and ions move quickly through that layer during switching. It may be desirable (although not required) to add a transparent anti ultra-violet (UV) layer 22 to protect the user's eyes from harmful UV rays. This layer also prevents organic materials (such as the EC polymer) from breaking down due to exposure to UV radiation.

During deposition of the EC polymer layer onto the ITO substrate, the electric potential drop caused by the surface resistance of ITO glass can cause the EC film to deposit non-uniformly. This issue can be addressed by using relatively low sheet resistance ITO glass and a copper tape electrode coupled to one or more edges of the ITO glass. The copper tape electrode can then be removed, or the ITO glass with the EC polymer film can be reshaped to remove the copper electrode, such that the electrode is not part of the resulting laminated structure.

Note that ITO substrate 14 includes a flange 24, and ITO substrate 18 includes a flange 26. These flanges can be used to electrically couple the layered EC device to a voltage source, and/or to attach the lens structure to a support member, where the support member is configured to enable the user to wear the smart eyewear. Flanges 24 and 26 are particularly well suited for coupling the laminated lens structure to the frame of a pair of sunglasses. It must be recognized that such flanges are intended to be exemplary, rather than limiting. For example, conductors 28 and 30 (such as wires or flexible conductive tapes or foil, as shown in FIG. 1B) can be embedded in the layered EC structure, to facilitate coupling the layered EC structure to a voltage source. If employed, conductor 28 electrically couples the working electrode (i.e., the EC polymer film and the ITO substrate) to the voltage source, and conductor 30 electrically couples to the counter electrode (i.e., $V_2O_5$ film and the ITO substrate) to the voltage source. It should also be recognized that the flanges are not required to mount a smart lens to a support, in that holes can be drilled through the smart lens, and non conductive fasteners can be used to attach the smart lens to a support member, or the smart lens can be sized and shaped to achieve an interference fit with a support member (as is commonly employed to attach eye glass lenses to an eye glass frame).

The EC material, PPropOT-Me$_2$ monomer was synthesized via a procedure described in described in U.S. Pat. No. 7,038, 828. All materials were purchased from Sigma-Aldrich Corporation (St. Louis, Mo.), except Tetra-n-butyl ammonium perchlorate (TBAP, electrochemical grade) and Lithium perchlorate (99% anhydrous, packed under argon), which were purchased from Alfa Aesar (Ward Hill, Mass.). Because the EC film being fabricated is sensitive to moisture and air, which affects the performance of the resulting laminated EC device, all the materials were dried before use and stored in a sealed container (i.e., a glove box) filled with argon.

The gel electrolyte was based on poly(methylmethacrylate) (PMMA) and lithium perchlorate (LiClO$_4$) and was plasticized using propylene carbonate (PC) and ethylene carbonate (EC), to form a highly transparent and conductive gel. It should be recognized that this specific gel electrolyte is intended to be exemplary, rather than limiting, and other electrolytes can be employed (including liquid electrolytes, although the use of gel electrolytes simplifies fabrication of the smart lens).

The EC film was deposited on the ITO substrate from a solution including 0.01 M of the monomer and 0.1 M of $LiClO_4$/Acetonitrile (ACN). Electrochemical deposition of the film was carried out by using an electrochemical analyzer (CHI 605A, CH Instruments), utilizing the chronoamperometry method. A three-electrode cell (with a silver wire as a reference electrode, an ITO glass (Thin Film Device) as a working electrode, and a platinum plate as a counter electrode) was used for electro-polymerizing the polymer film.

The vanadium pentoxide ($V_2O_5$) film was deposited on the ITO glass substrate by the chronoamperometry method in a $V_2O_5 \cdot nH_2O$ sol-gel solution. These gels were synthesized using conventional techniques.

After depositing the EC polymer film onto ITO substrate 14, and depositing the $V_2O_5$ film onto ITO substrate 18, both film/substrate combinations (i.e., the working electrode and the counter-electrode) were placed into a 0.1 M $LiClO_4$/PC electrolyte solution and were electrochemically conditioned (via chronocoulometry), in order to ensure that the inorganic ions in the films were compatible with the $LiClO_4$/PC environment provided by gel electrolyte layer 20. Of course, if a different gel electrolyte is employed, a corresponding different electrolyte solution would likely be employed for this step. It should be noted that rather than using a glass substrate, polymers could be used instead (such that the indium tin oxide layer is deposited on the polymer, as opposed to glass). The use of polymeric substrates rather than glass substrates may facilitate production of a curved smart lens, as opposed to a flat smart lens. Consumers are likely to consider curved smart lenses to be more fashionable, because curved lenses facilitate a wider choice of eyewear designs.

After conditioning both film/substrate combinations (i.e., the working electrode and the counter-electrode), the EC film coated ITO glass surface (i.e., the working electrode) was entirely covered with a uniform thin layer of the selected gel electrolyte. The $V_2O_5$ film coated ITO glass (i.e., the counter-electrode) was then placed on top of the working electrode, and the working electrode and the counter-electrode (with the gel electrolyte disposed between them) were clamped together. A UV curing epoxy (OG112-4, Epoxy Technology, Billerica, Mass.) was used as a hermetic barrier to seal the laminated EC device (i.e., the smart lens). The assembly process was performed in a glove box filled with argon, to eliminate quality degradation associated with exposure of the films to moisture and air (i.e., oxygen).

Figure 2:
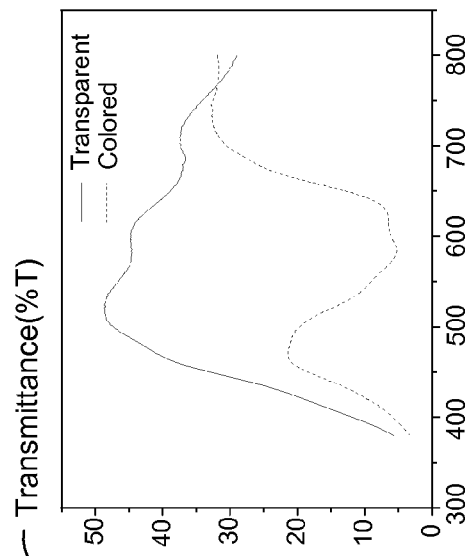

After assembly of the smart lens prototype, the optical performance (transmittance) of smart lens 10 was characterized on a spectrophotometer (a model V-570™ available from Jasco; Easton, Md.). FIG. 2 graphically illustrates the photo spectrum curves of smart lens 10 at wavelengths from about 380 nm to 800 nm. A voltage potential of 1.2 VDC was applied in a selected polarity, to achieve either a colored or transparent state. At a wavelength for incident light of about 580 nm, the transmittance (% T) of the smart lens is about 45% in the transparent state (i.e., the first state), and about 5% in the colored state (i.e., the second state).

Figure 3A:
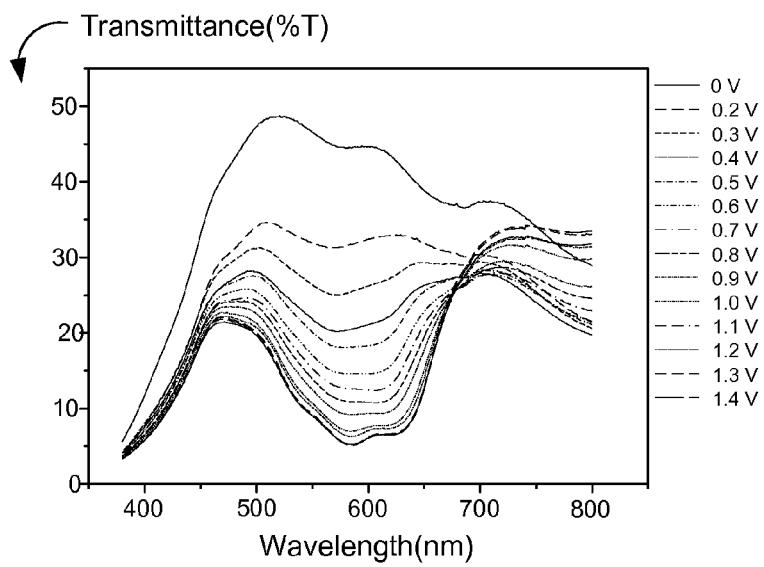
Figure 3B:
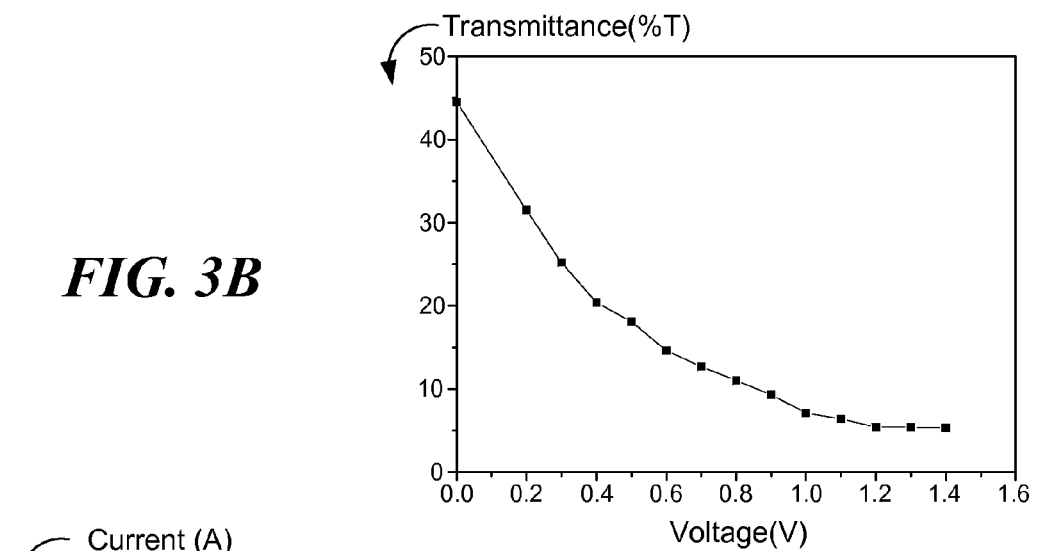

The spectrum data indicates that smart lens 10 changes its optical performance (in terms of its transmittance) as a function of the applied voltage potential. Significantly, the transmittance of light in the colored state can be adjusted by varying the voltage potential applied. The photo spectrum curves for different applied voltage potentials are graphically illustrated in FIG. 3A and FIG. 3B. Before each applied voltage, a 1.2 VDC potential was applied to the smart lens, in order to make it transparent (i.e., to transition the EC polymer film to the first state), and then an opposite potential varying from 0.2-1.4 VDC was applied for 1 second to color the lens (i.e., to transition the EC polymer film to the second state). The transmittance of the smart lens decreases as the applied voltage is increased, but the rate of change in transmittance gradually decreases as the potential is increased. After about 1.2 VDC, the spectrum curves are substantially similar.

During outdoor activities, sunglasses and goggles require a short response time in order to adapt to various rapidly changing environmental conditions. Therefore, the color changing response time of the smart lens was characterized and is graphically illustrated in FIG. 4. With ±1.2 VDC potential applied, the smart lens transitions to a fully saturated colored state (i.e., to the second state) in 1 second and, to a fully transparent state (i.e., the first state) in 2 seconds. This response time is much shorter than the response time exhibited by inorganic EC materials and is sufficiently fast to adjust to varying ambient lighting conditions found when hiking, skiing, or motorcycling (where such activities are intended to be exemplary, rather than limiting).

Significantly, not only is the driving voltage required to change the state of the smart lens relatively low, but the amount of electric charge needed to switch the optical state of the EC polymer is also relatively small. In other words, the energy consumption during switching is low. The electric charge consumption of right and left lenses (based on smart lens 10 of FIGS. 1A and 1B) was empirically measured. When switching the smart lens from the fully transparent state (i.e., the first state) to a fully colored state (i.e., the second state), the electric charge required was less than 0.02 Coulombs. Thus, the smart lens can be powered by commercially available button cell batteries (i.e., of the type generally used in watches, calculators, and hearing aids), whose standard electric capacity is around 100 Coulombs. A prototype of a pair of smart sunglasses, described in greater detail below, was powered by a single button cell battery with 1.55 VDC potential (e.g., an Energizer type EPX 76™ battery). The switching time between states in this prototype was about 2 seconds.

Figure 5A:
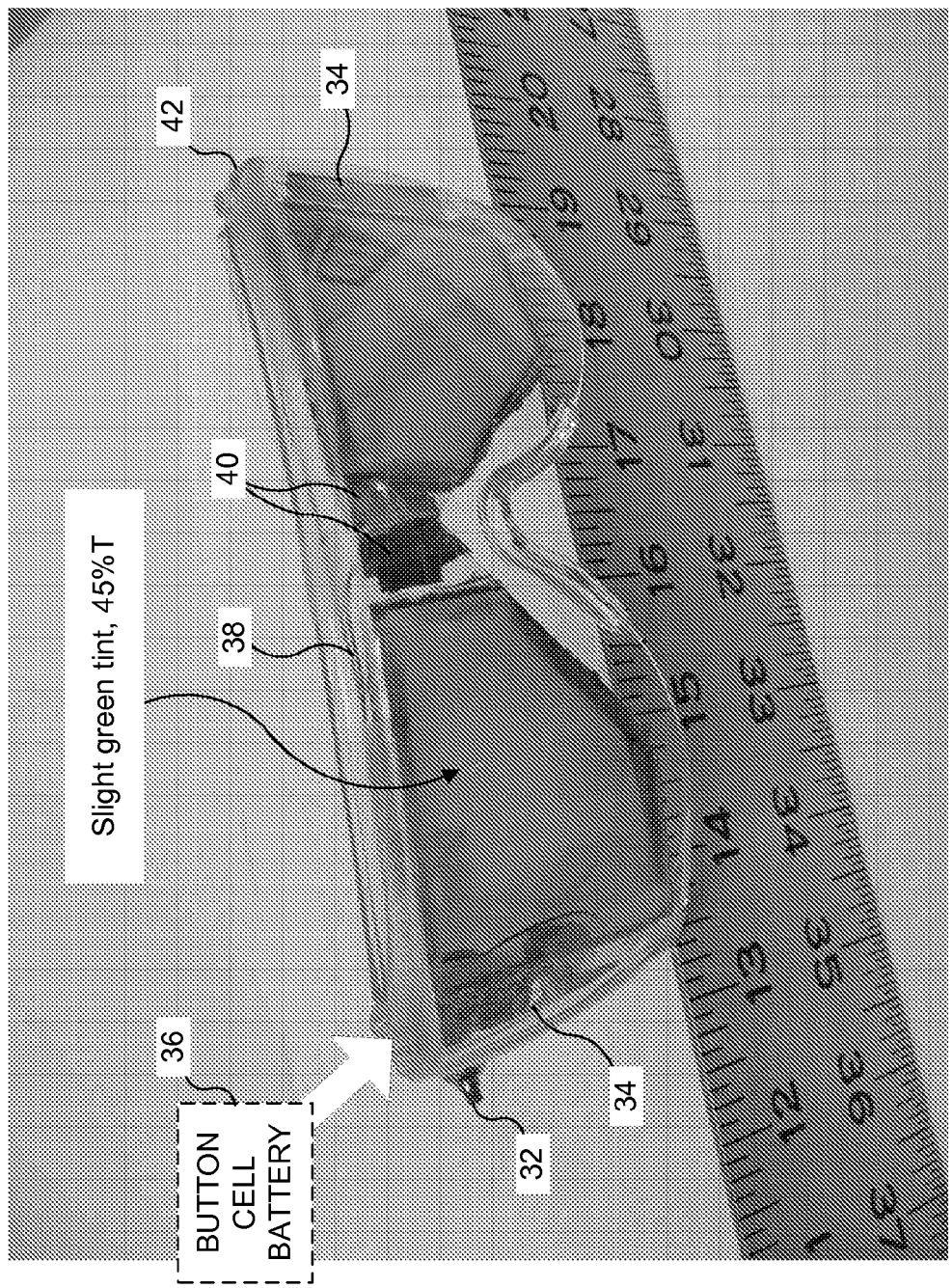
FIG. 5A is an image of a prototype of a pair of smart sunglasses incorporating the smart lens of FIG. 1A, where the EC polymer in the smart lens is in a first state (i.e., is generally transparent)
Figure 5B:
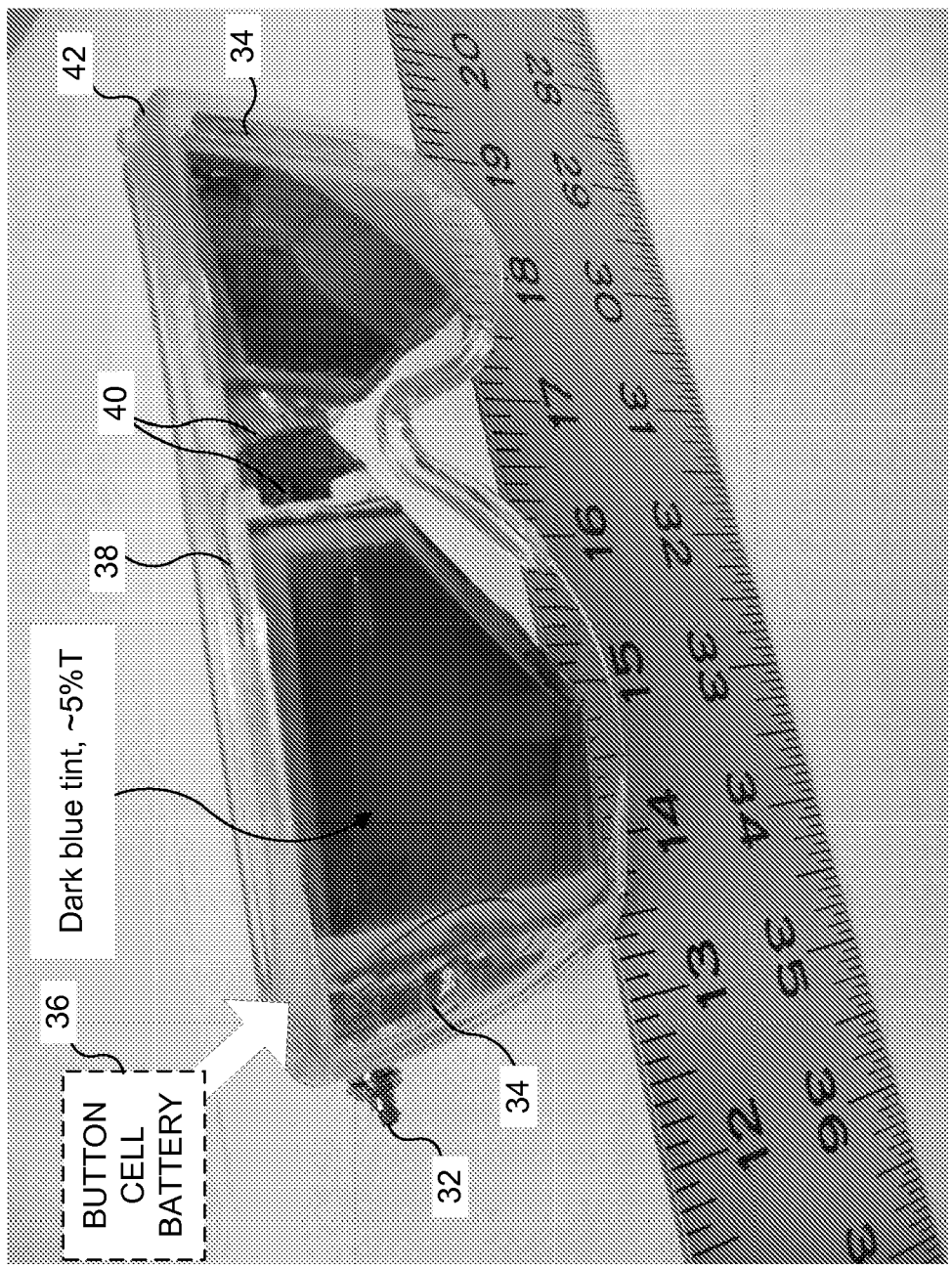
FIG. 5B is an image of the prototype of the pair of smart sunglasses incorporating the smart lens of FIG. 1A, where the EC polymer in the smart lens is in a second state (i.e., is generally opaque)

FIGS. 5A and 5B are images of the prototype pair of smart sunglasses noted above, fabricated using the smart lenses described above. Right and left smart lenses are adhesively coupled to a pair of plastic safety glasses 42. Copper tape 34 is used to couple flanges 16 of the right and left lenses to conductive wires 38. Similarly, copper tape 40 is used to couple flanges 18 of the right and left lenses to conductive wires 38, which are coupled to a button cell battery 36 and an on/off switch 32.

While other EC polymers can be employed, it is significant to note that PPropOT-Me$_2$ film based EC devices have long lifetimes and an open circuit memory function. After over 100,000 cycles of switching between the fully colored and fully transparent state, the prototype device of FIGS. 5A and 5B showed only a 6% change in transmittance. Furthermore, the prototype device was maintained in both the colored state and the transparent state without electric charge for 30 days. During that period, the transmittance at 580 nm changed less than 6% in the fully colored state. There was even less change in the transmittance of the transparent state.

In summary, the prototype device shown in FIGS. 5A and 5B was fabricated using a multi-layer laminated EC structure including a cathodic EC polymer film (PPropOT-Me$_2$) working electrode and a $V_2O_5$ film counter electrode (where both film layers were deposited on ITO glass). The laminated structure also included a transparent gel electrolyte sandwiched between the two electrodes. This EC film based device exhibited variable light transmittance (5%~45%), fast response time (1~2 seconds), low driving power (1.2-1.5 VDC) and low energy consumption (less than 0.02 Coulombs per switch). These characteristics indicate that EC polymer based smart lenses can be beneficially incorporated into smart eyewear such as smart sunglasses, smart helmets, and smart goggles.

Figure 6:
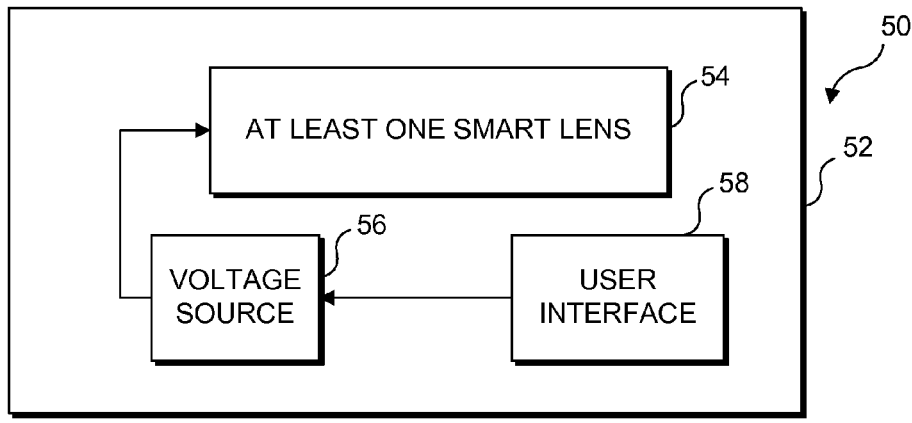
FIG. 6 is a block diagram showing the basic elements of the novel smart eyewear disclosed herein.

FIG. 6 schematically illustrates the basic elements of smart eyewear 50, which includes a support member 52, at least one smart lens 54, a voltage source 56 operatively coupled to each smart lens, and a user interface 58 (operatively coupled to the voltage source, to control the application of a voltage produced by the voltage source to the smart lens).

The smart lens in FIG. 6, will be generally consistent with the smart lens disclosed above, although it should be recognized that many modifications can be made to the smart lens described above, including the use of different EC polymers, the use of an anodic EC polymer in place of a cathodic EC polymer, the use of an EC device including both a cathodic EC polymer and an anodic EC polymer, the use of different electrolytes, and the use of a different counter-electrode. Many types of glasses include two lenses (one for each eye). However, some types of glasses (and many types of goggles) include a single larger lens that covers both eyes. Helmets (such as motorcycle helmets and sports helmets) often employ a single face shield/eye shield. Thus, the concepts disclosed herein encompass smart eyewear including one or more smart lenses.

Support member 52 can be implemented as a frame for eyeglasses, including two elongate arms or earpieces configured to fit over a user's ears, and a front piece configured to rest on a user's nose and support one or more lens elements. The elongate arms are generally hingedly coupled to the earpieces. However, it should be recognized that the smart eyewear disclosed herein is not limited to smart glasses, but also encompasses eyewear of other forms, including helmets and goggles. Thus, support member 52 can also be implemented in the form of a helmet (such as a motorcycle helmet or sports helmet for supporting a smart visor or smart eye shield/face shield, and frames for goggles (which often include a strap configured to slide behind a user's head to secure the goggles to the user's face). Support member 52 enables the user to wear the smart eyewear and also provides support for the smart lens. The smart lens(es) can be attached to the support member using many different attachment methods, including but not limited to fasteners, adhesives, interference fits, hinges, and combinations thereof.

As noted above, voltage source 56 is used for providing a required voltage to the EC polymer and can encompass disposable batteries, rechargeable batteries, one or more capacitors, conductors employed to convey the voltage from a voltage source to the EC polymer portion of the lens, energy harvesting elements, voltage sources integrated into the smart eyewear, voltage sources external of the smart eyewear, and permutations and combinations thereof. Disposable batteries will likely be frequently used to implement voltage source 56. Given the modest power requirements for smart eyewear, disposable batteries are readily available in compact form factors, and are convenient and low in cost. Compact batteries enable portable operation, will add only modest weight to the smart eyewear, and particularly with eyewear/glasses including thicker/larger earpieces, can be readily accommodated within the earpieces of the support member (and even more easily in a helmet based support member). Rechargeable batteries, and energy harvesting technologies (discussed in greater detail below) can also be employed. However, in embodiments where the smart eyewear will be used in a fixed location (such as in a vehicle or on motorcycle), instead of using a portable battery (or in addition to using a portable battery), voltage source 56 can encompass electrical cords and an interface configured to acquire voltage from the vehicle's onboard electrical system, or for other non-movable applications, may comprise a line-voltage operated power supply.

Many different types of user interfaces are available. A simple on/off switch can be employed. However, because transmittance of the EC polymer in the second state is a function of the applied voltage, a variable switch (such as a potentiometer or rheostat type switch) can be employed to enable the user to selectively vary the opacity of the lenses in the smart eyewear by varying the voltage applied to the EC polymer. For embodiments where style and fashion are important, invisible or unobtrusive touch activated switches can be employed. For example, a touch activated switch could be readily incorporated into one (or both) of the earpieces in a pair of smart sunglasses, such that the smart lenses can be actuated by the user simply applying a finger to the touch activated switch.

Figure 7:
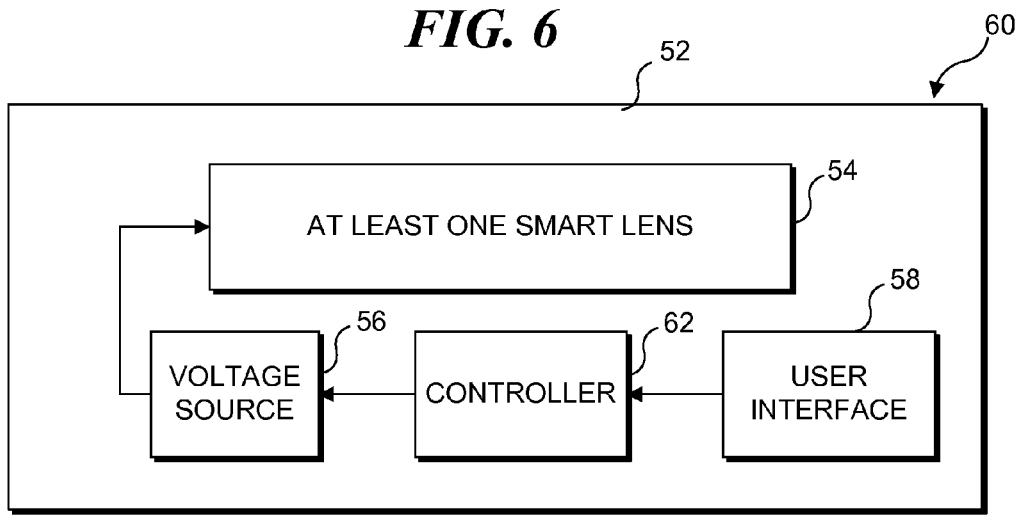
FIG. 7 is a block diagram of an exemplary embodiment of smart eyewear including a controller.

Having described the basic concepts of smart lenses and smart eyewear, further exemplary (but not limiting) embodiments will now be described. FIG. 7 schematically illustrates smart eyewear 60, which includes support member 52, at least one smart lens 54, voltage source 56 operatively coupled to each smart lens, a controller 62 (operatively coupled to the voltage source), and user interface 58 (operatively coupled to the controller). The incorporation of a controller enables the smart eyewear to support increasingly complicated and/or more versatile functionality. For example, if user interface 58 is implemented as a touch activated switch, controller 56 can be configured to implement different functions based on the number of times user interface 58 is sequentially actuated or based on the duration of the user continuously touching the touch activated switch. This approach will enable the touch actuated switch to not only switch the EC polymer from the first state to the second state, but also to selectively vary the voltage supplied, to thereby control the opacity of the lens in the second state. Furthermore, a single smart lens might include separately actuable elements (perhaps implemented using different EC polymers). For example, many types of lenses (particularly lenses for sunglasses) are more opaque at the top of the lens than at the bottom. Controller 62 can be configured to switch the EC polymer at the upper portion of a smart lens in response to a signal from a first switch, and to switch the EC polymer at the lower portion of a smart lens in response to a signal from a second switch (or in response to different inputs from a single switch), or to vary the opacity of either or both of the upper and lower portions of the smart lens in response to the signals from one or more switches. Controller 62 can be implemented using a microprocessor or an application specific integrated circuit (ASIC) or as a hard wired logic device or an analog circuit device, and can be implemented with a form factor sufficiently small to fit inside a support member (such as a helmet, or an earpiece of a pair of smart glasses).

Figure 8:
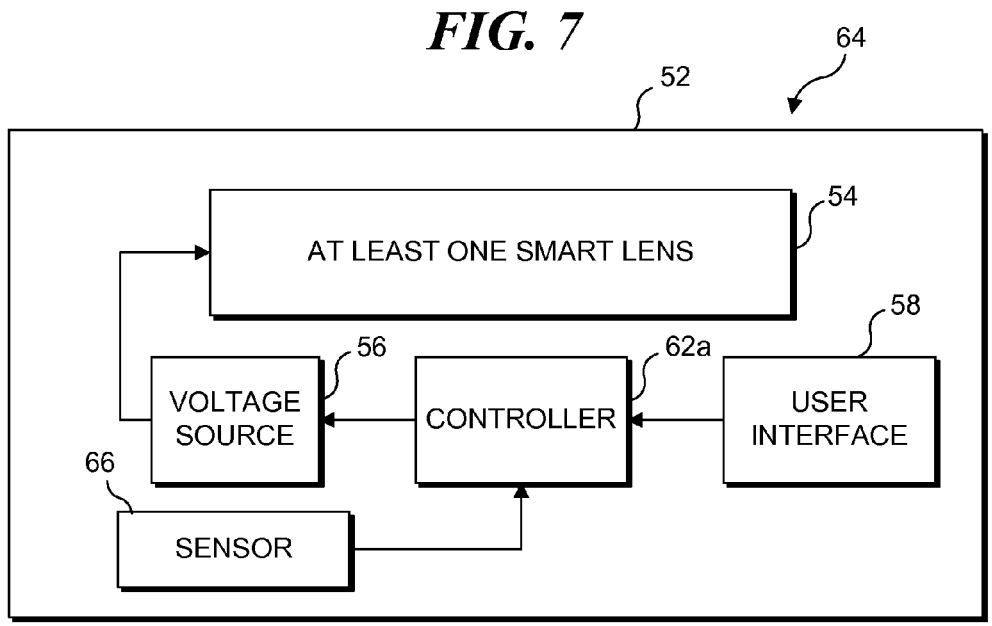
FIG. 8 is a block diagram of an exemplary embodiment of smart eyewear including a sensor and a controller configured to automatically control switching of the smart lens between a first state and a second state.

FIG. 8 schematically illustrates smart eyewear 64, which includes support member 52, at least one smart lens 54, voltage source 56 operatively and selectively coupled to each smart lens, user interface 58, a sensor 66, and a controller 62*a* (operatively coupled to the voltage source, the user interface, and the sensor). The incorporation of the sensor enables the smart eyewear to automatically respond to input from the sensor, in addition to (or in place of) input from the user interface. Thus, if desired, the user interface could be eliminated from this embodiment to make the operation of the smart eyewear fully automatic. Different types of sensors can be employed, individually or in combination. For example, sensor 66 can be implemented using a light sensor (preferably mounted in the support structure, facing generally along a line of sight of the user or so that the sensor is exposed to the same light as the eyes of the user would be if not wearing the smart eyewear), such that controller 62a is configured to automatically switch the state of the EC polymer to change the transmittance of the smart lens based on ambient light conditions. For example, if the wearer walks into a building after being outside in bright sunlight, the sensor will detect the reduced illumination levels, and the controller will automatically cause the EC polymer in the smart lens to transition from the second (tinted) state to the first (transparent state). Furthermore, controller 62a can be configured to vary the applied voltage when the EC polymer is in the second state, to vary the transmittance of the smart lens in the second state, so that the transmittance at moderate light illumination level is only reduced by a moderate amount. For example, a user may be driving in daylight, but moving in and out of shadows (due to trees, building or clouds). The sensor and controller can cooperate to vary the applied voltage, to increase or decrease the transmittance of the smart lens, based on ambient light conditions. The threshold light conditions that trigger a response from the controller can be preset, or in some embodiments, the user interface can be used to manage the threshold setting, to enable individual users to adjust the threshold settings to their particular taste. Another type of sensor that can be employed is an audio sensor (e.g., a microphone), such that the user can adjust the smart lens using voice prompts, if a voice recognition system is included in the controller to recognize specific commands to control the transmittance level of the smart lens.

In one exemplary embodiment, a sensor and user interface are provided, such that the wearer can use the user interface to select a desired transmittance level for given light conditions, and the sensor and controller are used to vary the transmittance in response to changing light conditions, such that the amount of light reaching the wearer's eyes does not substantially vary even as the ambient light levels change. For example, a wearer adjusts the smart eyewear such that a comfortable amount of light reaches the wearer's eyes during outdoor conditions that are partly cloudy. When the sensor (disposed to detect ambient light, as opposed to light reaching a user's eye, recognizing that light reaching a user's eye may have been reduced in intensity after passing through the smart lens) detects a decrease in ambient light conditions (such as the wearer walking into a building), the controller increases the transmittance of the smart lens (i.e., reduces the tinting/saturation of the smart lens in the second state, or switches to the first state, as needed) to compensate for the reduction in the ambient light. When the sensor detects an increase in ambient light conditions (such as might be caused by outdoor conditions moving from cloudy to sunny), the controller decreases the transmittance of the smart lens (i.e., increases the tinting/saturation of the smart lens in the second state) to compensate for the increase in the ambient light. The control can use known parameters of the smart lens to determine what transmittance level is required to compensate for the change in the ambient light conditions (i.e., by using a known relationship or lookup tables). In a slightly different embodiment, the sensor is disposed behind the smart lens, such that the sensor is measuring light intensity as experienced by the wearer, and the controller is configured to manipulate the transmittance of the smart lens to ensure that the intensity of light detected by the sensor remains constant.

FIG. 9 schematically illustrates smart eyewear 68, which includes support member 52, at least one smart lens 54, a rechargeable battery 72 operatively coupled to each smart lens, user interface 58, an energy harvesting element 70, and a controller 62b (operatively coupled to the rechargeable battery, the user interface, and the energy harvesting element). The incorporation of the controller enables the smart eyewear to respond to input from the user interface, and to control recharging of the battery via the energy harvesting element. The function of the energy harvesting element is to use the differential between ambient temperature and that of the user's body to produce electrical energy, which can be used to recharge the battery (or a capacitor) and prolong the operational life of the smart eyewear or eliminate the need for external charging of the battery.

Several types of energy harvesting elements have been employed to power wristwatches. In some watches, a cam uses kinetic energy from bodily motion to wind a mainspring, and the mainspring is used to drive the components of a mechanical watch. In other watches, the kinetic motion is converted to electricity and stored in a capacitor. Other energy harvesting technologies convert heat energy into electricity. While people move their heads frequently, and the kinetic energy of this head movement could be converted to small amounts of electrical energy, it is more likely that the heat converting technology will be preferred, because such technology can be semiconductor based and does not require the moving parts of the kinetic energy conversion technology. This technology is referred to as thermoelectric generation (TEG), which employs semiconductor elements that extract energy due to temperature differences between two junctions (i.e., producing an electrical current due to the difference between hot and cold environments) using the well-known Peltier-Seebeck effect. Alternatively, the technology can be based on a less refined approach, which uses the junctions between two dissimilar metals as the regions at which the hot and cold temperatures are applied to produce the voltage. While the difference between normal human body temperature and the ambient surrounding temperature is often only of few degrees, and such minor temperature differences enable relatively little electric power to be generated (and at voltages on the order of only about 200 mV), the smart eyewear disclosed herein does not require voltage from the voltage source except during switching between states, and over time, sufficient energy can be collected and stored to charge a rechargeable battery or to charge a capacitor that is the actual source of the voltage applied to the EC polymer material.

FIG. 10 schematically illustrates smart eyewear 74, which includes support member 52, at least one pixelated one smart lens 76, voltage source 56 operatively coupled to each smart lens, a controller 62c (operatively coupled to the voltage source and each pixel in the pixelated smart lens), and user interface 58 (operatively coupled to the controller). The incorporation of a controller and a pixelated smart lens enables the smart eyewear to support increasingly complicated and/or more versatile functionality, as individual pixels in the smart lens can be individually controlled.

For example, only pixels in certain portions (such as the upper portion) of the smart lens can be switched to the tinted states under certain conditions. In a more complicated smart lens, different pixels can be implemented using a different color EC polymer, and by selectively varying the state of individual pixels, the tint or shade of the smart lens can be varied as desired (for example, a user could switch from green tinted sunglasses, to brown tinted, to yellow tinted, etc., depending on the types of EC polymers employed). As red, blue, and green EC polymers have been developed, a large number of colors and shades can be supported.

If the individual pixels are made sufficiently small, it would be possible to display text or even images on the smart lens by controlling the transmittance of selected pixels to define the image of letters comprising text.

In such a pixelated display, the plurality of individually addressable pixels are preferably arranged in a grid format on the smart lens. Each pixel is a laminated EC device such as the laminated smart lens discussed above. By applying a voltage to each pixel individually, selective tinting can be achieved, pixel by pixel. The laminated EC devices described above are fabricated in a digital (pixel) array, whose size are typically in the range from 0.5-50 microns across.

It should be noted that while the empirical embodiment was fabricated using PPropOT-Me$_2$ as the only EC polymer in the smart lens, other EC polymers can be used to produce a smart lens. Furthermore, in addition to the single layer EC polymer (i.e., a single cathodic or anodic EC polymer) design, it will be recognized that smart lenses can be fabricated using multiple layers of EC polymers (such as a design that includes both an anodic EC polymer and a cathodic EC polymer), if desired. Such designs may be particularly well suited to smart lenses intended primarily for use in very bright light environments, since the use of multiple layers of EC polymers offers the ability to further reduce transmittance of the smart lens.

FIGS. 11 and 12 schematically illustrate a pair of smart glasses 100, which as shown, incorporates a plurality of the elements disclosed with respect to FIGS. 6-10. Thus, smart glasses 100 are intended to provide an example of how such elements can be integrated in a pair of smart glasses. It should be recognized that elements such as sensors, energy harvesting elements, and controllers are not required, and not all smart glasses encompassed by the disclosure provided herein need incorporate such elements (in other words, different embodiments could include different combinations of the elements discussed above with respect to FIGS. 6-10).

Smart glasses 100 include support member 52, a pair of smart lenses 54 (noting that a single, larger smart lens extending over a greater portion of smart glasses 100 could have been employed), rechargeable battery 72, which is operatively coupled to each smart lens (note that the electrical conductors coupling specific elements together have not been specifically shown, and that if desired, each smart lens could be powered by a separate battery), user interface 58, sensor 66, energy harvesting element 70, and controller 62b (operatively coupled to the rechargeable battery, the user interface, the sensor, and the energy harvesting element—although the conductors have not been shown). Further, note that depending on the specific combination of elements employed in smart glasses 100, other of controllers 62, 62a, and 62c might be beneficially employed. Each of the controller, sensor, battery, user interface, and energy harvesting element have been incorporated into the frame (i.e., support member 52) in this exemplary embodiment. For glasses having relatively larger earpieces, incorporating such elements into the earpieces of the frame will not be a challenge. While only a single energy harvesting element is shown, it should be recognized that one or more additional energy harvesting elements could be added to the other earpiece, and to the frame proximate a user's brow. The energy harvesting elements are desirably positioned proximate a user's skin to bring one junction of the energy harvesting elements into contact with the body temperature of the user.

Note that smart lenses 54 are shown as being generally circular in shape, although it should be recognized that many different curved form factors can be employed, even curved form factors (where a flexible polymer substrate is used in place of the ITO glass substrate, generally as discussed above). Each smart lens 54 is divided into an upper portion 54a and a lower portion 54b (noting that such division is exemplary to this embodiment, and not all embodiments encompassed herein will include such a division). In some embodiments, only upper portion 54a includes an EC polymer that can be manipulated to switch between a first state and a second state, where the transmittance of the lens is greater in the first state. In other embodiments, both the upper and lower portions include an EC polymer, such that the upper and lower portions can be individually controlled (for example, so that the upper portion can be activated without also activating the lower portion). The upper and lower portions can be implemented using the same EC polymer, or different EC polymers. If different EC polymers are used for the different portions, it will likely be preferable to use an EC polymer exhibiting less total transmittance in the second state for the upper portion.

FIG. 13 schematically illustrates a pair of exemplary smart glasses 102, which as shown, incorporates a plurality of the elements disclosed with respect to FIGS. 6-10. Again, smart glasses 102 are intended to provide an example of how such elements can be integrated in a pair of smart glasses. It should be recognized that elements such as sensors and energy harvesting elements are not required, and as has been indicated, not all smart glasses encompassed by the disclosure provided herein will include such elements.

Smart glasses 102 include a support member 52a (such as a wire frame, which is less suitable for incorporating elements such as a battery or controller therein), a pair of pixelated smart lenses 76 (noting that a single, larger smart lens extending over a greater portion of smart glasses 102 could have been employed instead), rechargeable battery 72 operatively coupled to each smart lens (noting that the electrical conductors coupling specific elements together have not been specifically shown), user interface 58, sensor 66, a plurality of energy harvesting elements 70a-70d, and controller 62c (operatively coupled to the rechargeable battery, the user interface, the sensor, the energy harvesting element, and each pixel in the pixelated smart lenses; although the conductors have not been shown). Further, note that depending on the specific combination of elements employed in smart glasses 102, other of controllers 62, 62a, and 62b might be beneficially employed. Note that the user interface is included on support member 52a, while the controller and battery have been moved to different portions of the eyewear, as discussed below.

While a plurality of energy harvesting elements 70a-70d are shown, it should be recognized that the relative position and number of such elements is intended to be exemplary, and not limiting. Where the energy harvesting elements rely on a user's body heat and the differential between the body temperature and ambient temperature to produce the voltage, the following portions of the smart glasses can beneficially incorporate such energy harvesting elements: portions of the support member/earpieces that engage the ears of a user (see energy harvesting element 70a), portions of the support member/earpieces that contact the sides of a user's head (see energy harvesting element 70b), portions of the support member/frame that contact a user's brow (see energy harvesting element 70c), and portions of the support member (i.e., nose pieces 80) that contact a user's nose (see energy harvesting elements 70d).

As noted above, the form factor of support member 52a is such that the battery and controller will not readily fit in the portion of the earpieces extending along side the head of a user, as in smart glasses 100 of FIGS. 11 and 12. Instead, those elements have been moved to one of two different locations. In a first exemplary embodiment, a portion 82 of support member 52a proximate a hinge 86 extends beyond the elongate earpiece, to provide space for the controller and battery 72. Some sport sunglasses (particularly those popular for winter sports, such as skiing) include a flexible sun shield disposed proximate portion 82, to prevent light from entering the sides of the glasses. Thus, the battery and controller could be incorporated into such a flexible sun shield, and hidden from casual view. If desired, a more rigid sun shield could also be implemented, to similarly support the battery and controller. It should also be noted that in many types of goggles, there is a relatively large volume proximate portion 82 that can be used to accommodate the controller and battery.

In a second exemplary embodiment, a portion 84 of support member 52a that engages a user's ear can be enlarged sufficiently to accommodate the controller and battery 72, which enables the balance of the support structure to be implemented using relatively thin elements common in wire frame glasses. In some embodiments, only a single earpiece includes such an enlarged portion 84, while in other embodiments both earpieces includes an enlarged portion. Where both earpieces include an enlarged portion, one earpiece can include a portion 84 housing the controller, while the other portion 84 can include the battery, thus both enlarged portions can be smaller than if a single enlarged portion includes both of these components. Regardless of whether one or two portions 84 are implemented, the portion(s) can also include an energy harvesting element as well, if desired. Further, the user interface can be included in portion 84, if the balance of the support structure does not provide sufficient space for including such an element.

Referring once again to hinge 86, it should be noted that where elements such as the battery and processor are disposed in the earpieces, some conductor must pass near the hinge to reach the smart lenses. Flexible conductors, particularly flexible tapes or woven strand leads, can be used to provide conductivity and flexibility.

FIG. 14 schematically illustrates a full face helmet 112 being worn by a user 110, in which a smart lens 114 has been included. It should be recognized that the concepts disclosed herein can also be used in connection with partial face helmets, thus, the specific form factor of the helmet is not important to this technology. Helmets are used in sports (particularly football), by motorcyclists and cyclists, in racing, in skydiving, by military pilots, by astronauts, and by riot police (noting that such a list is exemplary, and not limiting). The concepts disclosed herein can be used to produce smart helmets for such activities and many others. Significantly, helmets provide a much larger support member than do the frames of a pair of glasses, and incorporating elements such as energy harvesting members, processors, sensors, and batteries into the form factor of a helmet will be simple. Of the various embodiments disclosed above, it should be noted that including a sensor and controller configured to automatically adjust the transmittance of the smart lens in a smart helmet may be of particular interest in military aviation and aerospace applications, since pilots and astronauts generally do not have hands that can be freed to adjust smart lens transmittance manually, and the wearers of such helmets are often exposed to wide variations of ambient light intensity.

FIG. 15 schematically illustrates a user 120 wearing a pair of goggles 122 in which a smart lens 124 has been included. Goggles are used in sports (particularly skiing), by motorcyclists and cyclists, in racing, and in skydiving (noting that such a list is exemplary, and not limiting). The concepts disclosed herein can readily be used to produce smart goggles for such activities.

It should be recognized that several factors are involved in achieving variable transmittance with the smart lens designs disclosed herein. Variable transmittance can be achieved by applying different electrical potentials to the smart lens. For example, applying relatively larger potentials will result in relatively greater tint saturations, up until the minimum transmittance value is obtained. Thus, a relatively small applied potential (such as about −0.2V) will yield a relatively light tint and relatively greater transmittance, a relatively moderate applied potential (such as about −0.6V) will yield a relatively moderate tint and relatively less transmittance, and a relatively large applied potential (such as about −1.5V) will yield a relatively deep tint and relatively less transmittance as compared to the lower applied potentials. In addition to the applied voltage, the thickness of the EC polymer layer will also affect the light transmittance range. For example, a relatively thicker film layer might exhibit a variable transmittance ranging from about 45%-5%, while a relatively thinner EC polymer film might exhibit a variable transmittance ranging from about 70%-20%.

The smart lens designs disclosed herein can be incorporated into prescription eyewear. Optical blanks are often provided to optical outlets from optical laboratories. Such optical blanks are already formed to close-to-exact size with different curves ground into the front of the lens. Blanks with different curves are used for specific optical prescriptions. The optical outlet then customizes the rear of the optical blanks according to the wearers prescription. In one embodiment, a smart lens 132 (i.e., the layers described above to enable selective switching of one or more EC polymers between the desired states) will be sandwiched between glass or plastic optical blanks 130 (or between glass or plastic substrates that are subsequently ground into optical blanks), as schematically illustrated in FIG. 16A. In another embodiment, smart lens 132 is deposited onto an upper surface of blank 130, as schematically illustrated in FIG. 16B. When prescription glasses are customized for a wearer, often only the lower (or inner) surface of the blank needs to be modified (to adjust the power of the lens). Thus, optical manufacturers can include the smart lens layer in blanks provided to optical providers for customization for a specific wearer. The smart lens can be added to an optical lens as a fully functional layer (relatively thin smart lenses can be achieved, and the use of flexible substrates in a smart lens will enable the smart lens to match the curvature of an optical blank), or an optical blank can be coated with an indium tin oxide layer, such that the optical blank functions as one of the transparent electrodes in the smart lens. For example, the upper surface of the optical blank (after being ground to proper dimensions) can be coated with indium tin oxide, and the EC polymer layer can be deposited on the upper surface of the optical blank. The balance of the smart lens can then be fabricated as discussed above in connection with the description of FIGS. 1A and 1B. It should be recognized that optical blanks used for prescription lenses are available in many form factors, such that prescription smart lenses can be incorporated into many different types and styles of eyewear. Further, it should also be recognized that smart lens layers can be sandwiched between glass or plastic substrates that are subsequently ground and polished to achieve a prescription lens.

Figure 4:
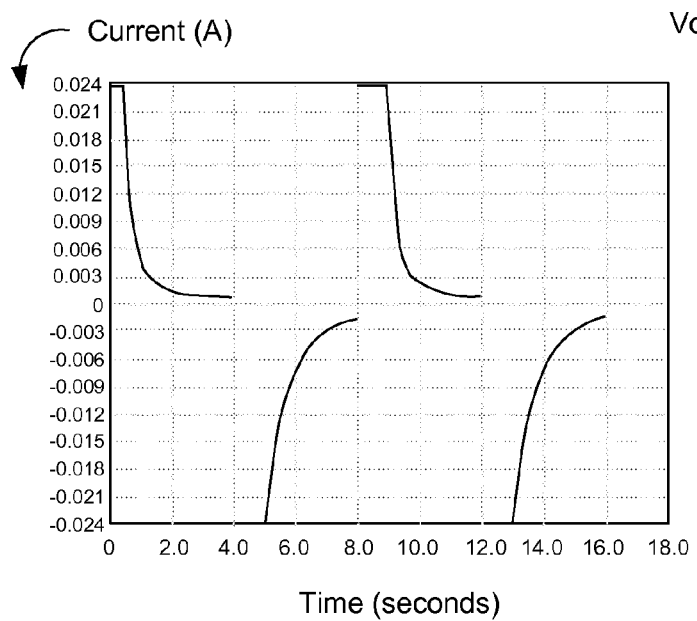

It should be recognized that the graphs of FIGS. 2, 3, and 4 were prepared using data from initial empirical studies. Later studies have confirmed the soundness of the working principles disclosed herein, and indicate even better switching and variable transmittance performance is achievable than the preliminary studies indicated. For example, subsequent studies achieved faster switching times with the empirical device than are indicated in FIG. 4, and that a more stable transmittance plateau is achieved in the transparent state than is indicated in FIGS. 2 and 3.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. Smart eyewear exhibiting variable light transmittance functionality, comprising:
   (a) a smart lens member including an electrochromic (EC) polymer, the EC polymer being switchable between a first state and a second state by selectively applying a voltage thereto, wherein the EC polymer transmits more light in the first state than in the second state;
   (b) a voltage source member that is selectively connectable to the smart lens and is configured to provide the voltage required to switch the EC polymer between the first state and the second state;
   (c) a controller configured to control the state of the EC polymer, the controller being operatively coupled to the smart lens member and the voltage source member;
   (d) a support member configured to support the lens and enable a user to wear the smart eyewear, the support member comprising a first earpiece and a second earpiece, the controller being incorporated into at least one of the first earpiece and the second earpiece such that the controller is not readily visible; and
   (e) an energy harvesting element configured to enable energy from a user of the smart eyewear to provide the voltage required to switch the EC polymer between the first state and the second state, wherein the energy harvesting element meets at least one condition selected from a group of conditions consisting of:
      (i) a first condition wherein the energy harvesting element converts heat energy from a user of the smart eyewear to electrical energy; and
      (ii) a second condition wherein the energy harvesting element produces electrical energy when there is a difference of more than about two degrees Celsius between a body of the user and an ambient environment.

2. The smart eyewear of claim 1, wherein the voltage source member comprises a battery electrically coupled to the smart lens member.

3. The smart eyewear of claim 1, further comprising a user interface configured to enable a user to selectively switch the EC polymer between the first state and the second state.

4. The smart eyewear of claim 3, wherein the user interface is a touch sensor that is activated by being touched.

5. The smart eyewear of claim 3, wherein the user interface enables the voltage to be selectively varied, to selectively vary a transmittance of the EC polymer in the second state.

6. The smart eyewear of claim 1, further comprising a microphone operatively coupled to the controller, such that the controller is configured to automatically switch the EC polymer between the first state and the second state based on a signal provided by the microphone corresponding to an audible command.

7. The smart eyewear of claim 1, wherein the EC polymer in the smart lens member is configured as a plurality of individually addressable pixels arranged in a grid format, each pixel being switchable between a transparent state and non-transparent state by selectively applying a voltage thereto.

8. The smart eyewear of claim 7, wherein the controller is operatively coupled to each pixel, and the plurality of individually addressable pixels are implemented using different EC polymers, enabling at least one of a tint and a color associated with the smart lens member to be selectively varied by switching the plurality of individually addressable pixels with an applied voltage.

9. The smart eyewear of claim 7, wherein the controller is operatively coupled to each pixel, and the controller is configured to selectively actuate pixels disposed proximate an upper portion of the lens.

10. The smart eyewear of claim 1, wherein the smart lens member comprises a laminated EC structure having a cathodic EC polymer layer and no anodic EC polymer layer.

11. The smart eyewear of claim 1, wherein the EC polymer in the smart lens member is disposed in an upper portion of the smart lens member.

12. The smart eyewear of claim 1, further comprising an additional smart lens member.

13. The smart eyewear of claim 1, wherein the EC polymer in the smart lens member comprises a first EC polymer disposed in an upper portion of the smart lens member, and a second EC polymer disposed in a lower, portion of the smart lens member, such that a transmittance of each of the upper and lower portions of the smart lens member can be individually controlled.

14. The smart eyewear of claim 1, wherein the smart lens member comprises a laminated structure, the laminated structure comprising the EC polymer and further including:
   (a) a first substantially transparent electrode;
   (b) a substantially transparent gel electrolyte, such that the EC polymer is disposed between the first substantially transparent electrode and the substantially transparent gel electrolyte;
   (c) an ion storage layer; and
   (d) a second substantially transparent electrode, such that the ion storage layer is disposed between the second substantially transparent electrode and the substantially transparent gel electrolyte.

15. The smart eyewear of claim 14, wherein at least one of the first substantially transparent electrode and the second substantially transparent electrode comprises a flange that extends beyond an edge of the laminated structure, each flange being configured to facilitate coupling the laminated structure to the support member.

16. The smart eyewear of claim 14, wherein the ion storage layer comprises a vanadium pentoxide film.

17. The smart eyewear of claim 16, wherein the vanadium pentoxide film exhibits a green tint, such that even when the EC polymer is in the first state, a transmittance of the smart lens member is reduced due to the green tint.

18. The smart eyewear of claim 14, wherein the second substantially transparent electrode is covered by an anti-ultraviolet layer configured to reduce an intensity of ultra-violet radiation entering the laminated structure.

19. The smart eyewear of claim 14, wherein the EC polymer and the ion storage layer are conditioned by exposure to the gel electrolyte prior to assembly.

20. The smart eyewear of claim 1, wherein the smart lens member is incorporated into an optical blank used for prescription eyewear.

21. Smart eyewear exhibiting a variable light transmittance functionality, comprising:

(a) a smart lens member including at least one electrochromic (EC) polymer, each EC polymer being switchable between a first state and a second state by selectively applying a voltage thereto, wherein the EC polymer transmits more light in the first state than in the second state;

(b) a voltage source for providing the voltage required to switch each EC polymer between the first state and the second state;

(c) a support member configured to support the lens and enable a user to wear the smart eyewear, and (d) an energy harvesting element configured to enable energy from a user of the smart eyewear to provide the voltage required to switch the EC polymer between the first state and the second state, wherein the energy harvesting element meets at least one condition selected from a group of conditions consisting of:

(i) a first condition wherein the energy harvesting element converts heat energy from a user of the smart eyewear to electrical energy; and (ii) a second condition wherein the energy harvesting element produces electrical energy when there is a difference of more than about two degrees Celsius between a body of the user and an ambient environment.

22. The smart eyewear of claim 21, wherein the smart eyewear is implemented using a form factor selected from a group consisting of:

(a) a helmet in which the smart lens member functions as a face shield;

(b) a helmet in which the smart lens member functions as an eye shield;

(c) a pair of sunglasses;

(d) a sports goggle;

(e) a ski goggle; and (f) a pair of safety glasses.

23. The smart eyewear of claim 21, further comprising a smart lens exhibiting a variable light transmittance functionality, wherein the smart lens comprises a laminated structure, the laminated structure including:

(a) a first substantially transparent electrode;

(b) at least a portion of the (EC) polymer, the portion of the EC polymer being switchable between the first state and the second state by selectively applying the voltage required to switch each EC polymer thereto, wherein the portion of the EC polymer transmits more light in the first state than in the second state;

(c) a substantially transparent gel electrolyte, such that the portion of the EC polymer is disposed between the first substantially transparent electrode and the substantially transparent gel electrolyte;

(d) an ion storage layer;

(e) a second substantially transparent electrode, such that the ion storage layer is disposed between the second substantially transparent electrode and the substantially transparent gel electrolyte; and (f) conductors used to couple the smart lens to the voltage source, wherein at least one of the first substantially transparent electrode and the second substantially transparent electrode comprises a flange that extends beyond an edge of the laminated structure, each flange being configured to facilitate coupling the laminated structure to the support member.

* * * * *